United States Patent [19]

Peickert

[11] Patent Number: 4,635,813
[45] Date of Patent: Jan. 13, 1987

[54] FILLER NECK INSERT

[76] Inventor: Marlin W. Peickert, 2 Herron La., St. Paul, Minn. 55112

[21] Appl. No.: 669,379

[22] Filed: Nov. 7, 1984

[51] Int. Cl.⁴ .................. B65B 39/00; B65D 25/02
[52] U.S. Cl. .................................. 220/86 R; 138/40; 141/391; 141/392; 411/521; 411/910
[58] Field of Search .......... 220/86 R, 86 AT, 86 NR, 220/307, 85 F; 411/521, 913, 910; 138/44, 40; 141/370, 391, 392, 348

[56] References Cited

U.S. PATENT DOCUMENTS

| | | | |
|---|---|---|---|
| 2,497,827 | 2/1950 | Trofton | 220/307 |
| 2,527,053 | 10/1950 | Bedford, Jr. | 220/307 X |
| 2,670,226 | 2/1954 | Becker | 411/521 X |
| 2,712,262 | 7/1955 | Knohl | 411/521 |
| 3,359,021 | 12/1967 | Wurzel et al. | 285/340 X |
| 3,911,977 | 10/1975 | Berger | 220/86 R X |
| 4,034,784 | 7/1977 | Ball et al. | 220/86 R X |
| 4,248,279 | 2/1981 | Warmbold | 141/348 |
| 4,424,839 | 1/1984 | Otani et al. | 220/86 R X |
| 4,529,097 | 7/1985 | Lavson | 220/86 R |

FOREIGN PATENT DOCUMENTS 2360655  6/1975  Fed. Rep. of Germany ........ 220/86 AT Primary Examiner—Allan N. Shoap
Attorney, Agent, or Firm—Herman H. Bains

[57] ABSTRACT

The insert of the invention is designed for installation in a gasoline filler neck so that the neck is restricted to a size allowing filling only by unleaded gasoline-size nozzles. The insert is designed for situations where the original restrictor has been removed and/or altered so that regular gas may be used. The insert is designed with locking teeth around the perimeter to allow the insert to be placed into the neck and yet provide that the insert is difficult to remove.

2 Claims, 3 Drawing Figures

U.S. Patent     Jan. 13, 1987     4,635,813
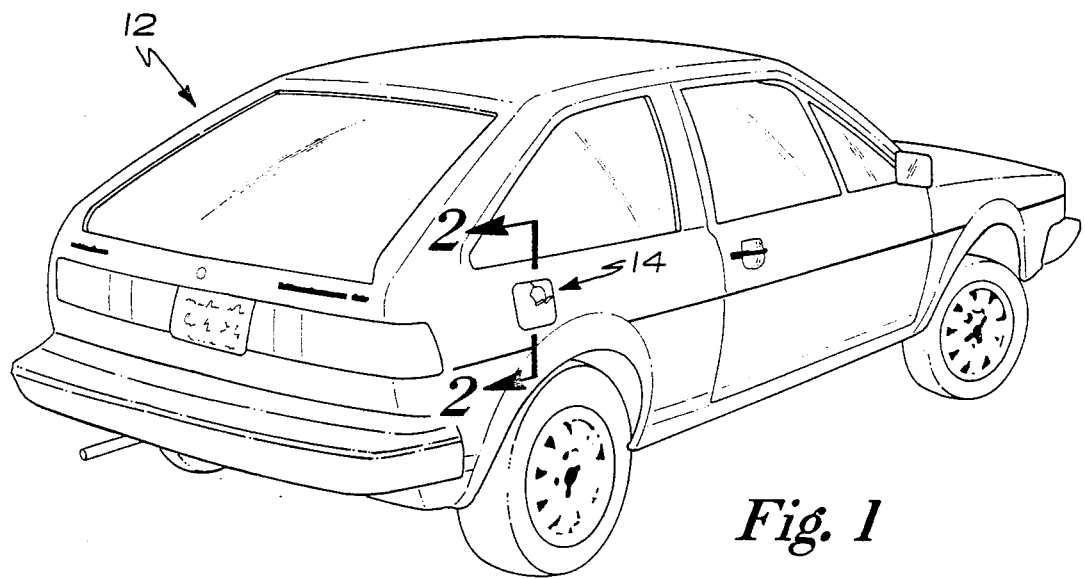
*Fig. 1*
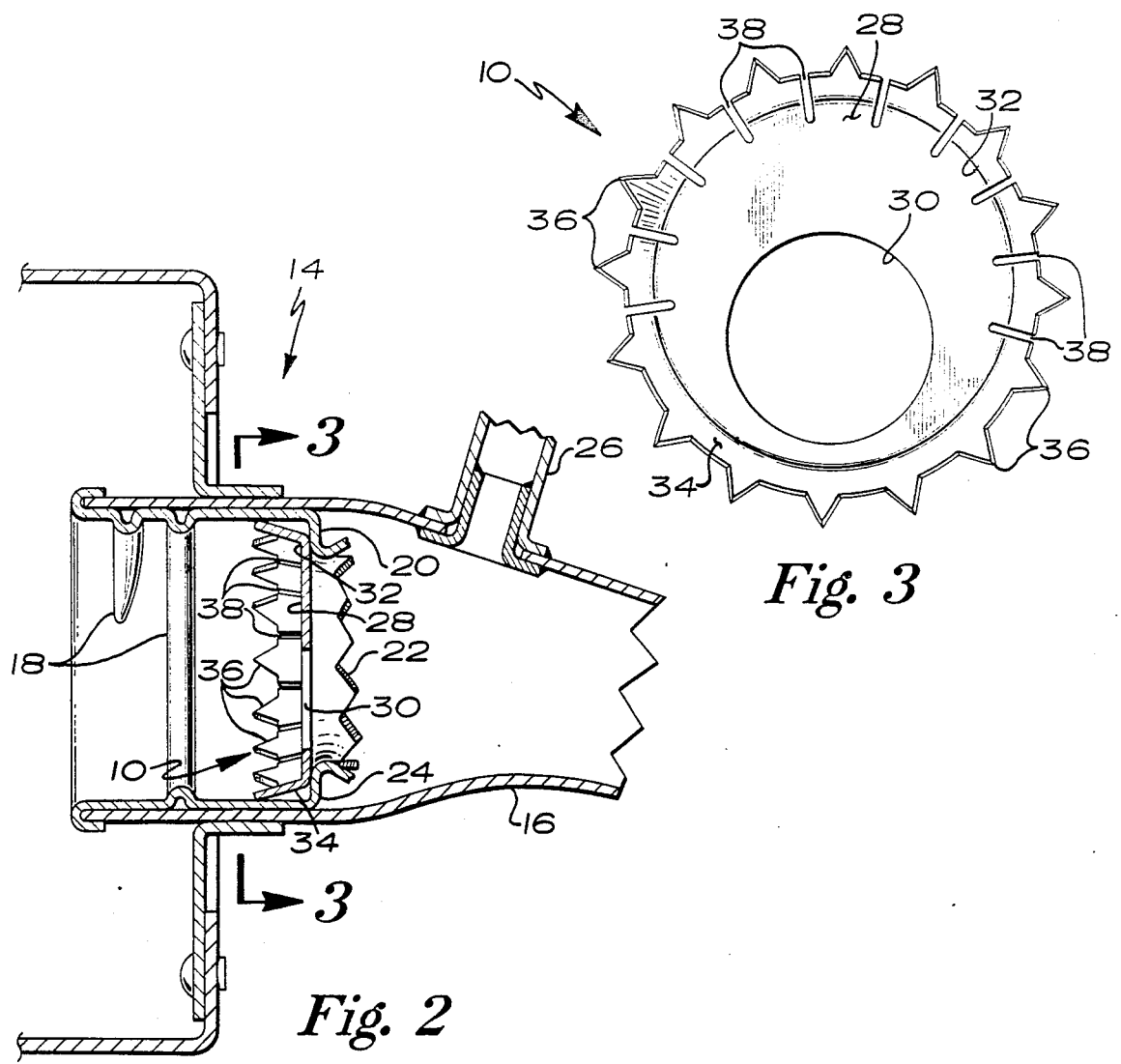
*Fig. 3*
*Fig. 2*

FILLER NECK INSERT

BACKGROUND OF THE INVENTION

In recent years for various reasons, most automobiles are required to use unleaded gasoline. In order to accomplish this restriction, pumps which dispense unleaded gasoline have a smaller sized nozzle than those pumps which dispense various leaded types of gasoline. Cars requiring unleaded gasoline typically have a filler neck having a restrictor located in the neck sized to accept only the smaller unleaded nozzle. As leaded gasoline has typically remained cheaper than unleaded gasoline, many motorists have altered the unleaded filler necks by means of chiseling, punching or the like to remove the restriction and allow the introduction of leaded gasoline into a vehicle designed for unleaded gasoline. Such alteration and tampering, in addition to being illegal, can cause deleterious effects on vehicle performance.

Various state and Federal laws require the restrictor located in the filler neck to remain intact at all times and particularly upon resale of such a vehicle. In states with inspection laws, the insert must remain intact in order for a vehicle to be registered. Due to the original construction of tanks and filler necks by vehicle manufacturers, restoration of the original restricted filler neck can be an expensive and time-consuming proposition requiring in many cases replacement of the complete neck assembly or even the entire gas tank as the tank often is produced integrally with the filler neck.

It is therefore an object of this invention to provide a filler neck restrictor which may be easily inserted into a vehicle filler neck and yet which is highly resistant to removal therefrom. It is further an object of this invention to provide a restrictor which will comply with the applicable statutes and regulations and yet may be inexpensively and easily installed.

SUMMARY OF THE INVENTION

The insert of the instant invention is designed for use with a gasoline filler neck which has been altered to accept a larger, leaded gasoline-type nozzle. Typically, such alteration is accomplished by chiseling or otherwise opening up the smaller, unleaded sized opening. Due to the construction of the filler neck, this often leaves a small shelf or rim around the edge of the filler neck upon which the instant invention may rest. The invention itself is formed from a generally circular disk ideally made of spring steel. A generally circular central panel is provided which is slightly smaller than the inside diameter of the filler neck. Located in the central panel is a smaller opening sized to accept only an unleaded sized filler nozzle. An angled flange extends radially outwardly and upwardly from the central panel and has located about the periphery thereof a number of sharp teeth. Preferably, slots are provided to separate segments of the flange so as to allow flexing when the device is installed.

The device is generally installed with the teeth angled outwardly; that is, toward the exterior of the car and the central panel placed in first and pressed downwardly until it seats upon the remaining ridge of the original restrictor plate. Because the teeth are angled upwardly and outwardly, any attempt to remove this plate merely results in the teeth imbedding themselves further into the cylindrical inner surface of the filler neck.

These and other objects and advantages of the invention will appear more fully from the following description made in conjunction with the accompanying drawings wherein like reference characters refer to the same or similar parts throughout the several views.

BRIEF DESCRIPTION OF THE DRAWINGS

FIG. 1 is a perspective view showing a vehicle in which the instant invention may be utilized.

FIG. 2 is a sectional view taken along line 2—2 of FIG. 1.

FIG. 3 is a plan view looking in the direction of line 3—3 of FIG. 2.

DESCRIPTION OF THE PREFERRED EMBODIMENT

The instant invention, generally designated 10, is designed for use in a vehicle 12 having a filler assembly 14. Filler assembly 14 is generally comprised of a neck 16 which may have threads 18 therein for retention of a screw-on cap. Filler assembly 16 is generally provided with an original restrictor assembly 20 which has had the original hole therein chiseled out or otherwise opened up to form a new, unrestricted opening 22. Sometimes, a small shoulder or ledge 24 remains of the original restrictor assembly 20.

The restrictor assembly of the instant invention 10 is shown by itself in FIG. 3 and in the preferred emodiment is stamped from a single piece of spring steel. The restrictor 10 is formed having a generally circular central portion 28 with a hole 30 therein, hole 30 being sized to accept only an unleaded filler nozzle. Extending radially outwardly and at an angle from the plane of central portion 28 is a flange 34 which is separated from the central portion 28 by a crease 32. Generally, circular flange 34 has extending therefrom a plurality of teeth 36. A number of slots 38 are preferably provided in flange 34 and the outer portion of central portion 28 to enhance flexibility and ease of insertion.

For insertion, the restrictor 10 is simply inserted into the filler neck 16 with the teeth 36 facing outwardly until the edge of central protion 28 seats upon the remaining ledge 24 of the original restrictor 20.

While the preferred embodiment of the present invention has been described, it should be understood that various changes, adaptions and modifications may be made therein without departing from the spirit of the invention and the scope of the appended claims.

What is claimed is:

1. A retrofittable single piece gasoline filler neck restrictor insert for installation into commercial stock automobiles and light trucks for restricting a filler neck having an inlet opening through which a filler nozzle is inserted, or for repairing a damaged or tampered unleaded gas filler tube restrictor, said insert comprising:

a generally circular planar central portion;

an aperture in said central portion sized to accept only an unleaded filler nozzle;

an annular flange integral with said planar central portion and extending at an angle therefrom, a plurality of circumferentially spaced apart slots in a circumferential portion of said flange and extending into the outer portion of said central portion, said circumferential portion of said annular flange enhancing flexing thereof during insertion of said restrictor insert; and locking means comprising a plurality of fingers extending radially outwardly from said annular flange and at an angle from the plane of said central portion, said fingers facing outwardly when said restrictor insert is inserted into the filler neck, said fingers having pointed ends defining a diameter greater than the inner diameter of the filler neck and being adaptable for engagement with the inner surface of the filler neck for retaining said insert in a filler neck and preventing withdrawal of said insert after insertion.

2. The filler neck insert of claim 1 wherein said material is spring steel.

* * * * *